United States Patent [19]
McCarley et al.

[11] Patent Number: 6,092,034
[45] Date of Patent: Jul. 18, 2000

[54] STATISTICAL TRANSLATION SYSTEM AND METHOD FOR FAST SENSE DISAMBIGUATION AND TRANSLATION OF LARGE CORPORA USING FERTILITY MODELS AND SENSE MODELS

[75] Inventors: Jeffrey Scott McCarley, Bedford Hills; Salim Roukos, Scarsdale, both of N.Y.

[73] Assignee: International Business Machines Corporation, Armonk, N.Y.

[21] Appl. No.: 09/123,166

[22] Filed: Jul. 27, 1998

[51] Int. Cl.[7] .................................................. G06F 17/28
[52] U.S. Cl. ...................... 704/2; 704/4; 704/9; 704/277
[58] Field of Search .................. 704/9, 2, 3, 4, 704/7, 1, 8, 10, 277, 251, 255, 257; 711/1; 707/530, 531, 532

[56] References Cited

U.S. PATENT DOCUMENTS

| | | | |
|---|---|---|---|
| 5,477,451 | 12/1995 | Brown et al. | 704/9 |
| 5,510,981 | 4/1996 | Berger et al. | 704/2 |
| 5,768,603 | 6/1998 | Brown et al. | 704/9 |
| 5,805,832 | 9/1998 | Brown et al. | 711/1 |
| 5,987,404 | 11/1999 | Della Pietra et al. | 704/9 |

FOREIGN PATENT DOCUMENTS

| | | |
|---|---|---|
| 525470 A2 | 2/1993 | European Pat. Off. . |

OTHER PUBLICATIONS

Brown et al., "The Mathematics of Statistical Machine Translation: Parameter Estimation", Computational Linguistics, vol. 19, No. 2, pp. 263–311, 1993.

Brown et al., "Aligning Sentences in Parallel Corpora", Proceedings, 29th Annual Meeting of the Association for Computational Linguistics, pp. 169–176, Jun. 1991.

Bahl et al., "A Maximum Likelihood Approach to Continuous Speech Recognition", IEEE Transaction on Pattern Analysis and Machine Intelligence, vol. PAMI–5, No. 2, pp. 179–187, Mar. 1983.

Berger et al., "A Maximum Entropy Approach to Natural Language Processing", Computational Linguistics, vol. 22, No. 1, pp. 39–71, 1996.

Della Pietra et al., "Inducing Features of Random Fields", IEEE Transactions Pattern Analysis and Machine Intelligence, vol. 19, No. 4, Apr. 1997.

Hackett et al., "Document Translation for Cross–Language Text Retrieval at the University of Maryland", The 6th Text REtrieval Conference (TREC–6), ed. by E.M. Voorhees and D.K. Harman.

*Primary Examiner*—Joseph Thomas
*Attorney, Agent, or Firm*—F. Chau & Associates, LLP

[57] ABSTRACT

A system and method for translating a series of source words in a first language to a series of target words in a second language is provided. The system includes an input device for inputting the series of source words. A fertility hypothesis generator operatively coupled to the input device generates at least one fertility hypotheses for a fertility of a source word, based on the source word and a context of the source word. A sense hypothesis generator operatively coupled to the input device generates sense hypotheses for a translation of the source word, based on the source word and the context of the source word. A fertility model operatively coupled to the fertility hypothesis generator determines a probability of the fertility of the source word, based on the source word and the context of the source word. A sense model operatively coupled to the sense hypothesis generator determines a probability of a target word being a correct translation of the source word, based on the source word and the context of the source word. A decoder operatively coupled to the fertility and sense models for generating a list of target words for the translation of the source word, based on the probability calculated by the fertility model and the probability calculated by the sense model.

37 Claims, 2 Drawing Sheets

STATISTICAL TRANSLATION SYSTEM AND METHOD FOR FAST SENSE DISAMBIGUATION AND TRANSLATION OF LARGE CORPORA USING FERTILITY MODELS AND SENSE MODELS

The U.S. Government has a paid-up license in this invention and the right in limited circumstances to require the patent owner to license others on reasonable terms as provided for by the terms of Grant No. 70NANB5H1174 awarded by the National Institute of Standards and Technology (NIST).

BACKGROUND OF THE INVENTION

1. Technical Field

The present invention relates to translation systems for translating a source language into a target language and, more particularly, to a system and a method employing statistics to disambiguate and translate a source language into a target language.

2. Discussion of Related Prior Art

There has long been a desire to have machines capable of translating text from one language into text in another language. Such machines would make it easier for humans who speak different languages to communicate with one another.

In general, machine translation systems fall broadly into two categories: rule-based and statistical. The rule-based approaches suffer from many deficiencies in comparison to statistical approaches. The main deficiencies of the rule-based approaches are complexity, and the requirement of a human expert in order to add new rules and to resolve problems which arise when a newly added rule conflicts with a pre-existing rule. For example, if the system is being used to translate newspaper articles, then new words and new usages of old words may appear as events unfold. On the other hand, a statistical system can simply be retrained with new training data. Ambiguities and conflicts with previous usages of words are automatically resolved by the underlying statistical model.

Prior work on machine translation (for both categories of systems) has focused on accuracy at the expense of speed. Thus, it would be desirable and highly advantageous to have a machine translation system which is fast enough to translate a large corpora of text, while still being sufficiently accurate to perform information retrieval. It would be further desirable for such a machine translation system to be statistically based.

SUMMARY OF THE INVENTION

According to one aspect of the invention, a system for translating a series of source words in a first language to a series of target words in a second language is provided. The system includes: an input device for inputting the series of source words; a fertility hypothesis generator operatively coupled to the input device for generating at least one fertility hypotheses for a fertility of a source word, based on the source word and a context of the source word; a sense hypothesis generator operatively coupled to the input device for generating sense hypotheses for a translation of the source word, based on the source word and the context of the source word; a fertility model operatively coupled to the fertility hypothesis generator for determining a probability of the fertility of the source word, based on the source word and the context of the source word; a sense model operatively coupled to the sense hypothesis generator for determining a probability of a target word being a correct translation of the source word, based on the source word and the context of the source word; and a decoder operatively coupled to the fertility and sense models for generating a list of target words for the translation of the source word, based on the probability calculated by the fertility model and the probability calculated by the sense model.

Preferably, the system includes a source language preprocessor operatively coupled between the input device and the fertility and sense hypothesis generators, for preprocessing the series of source words.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
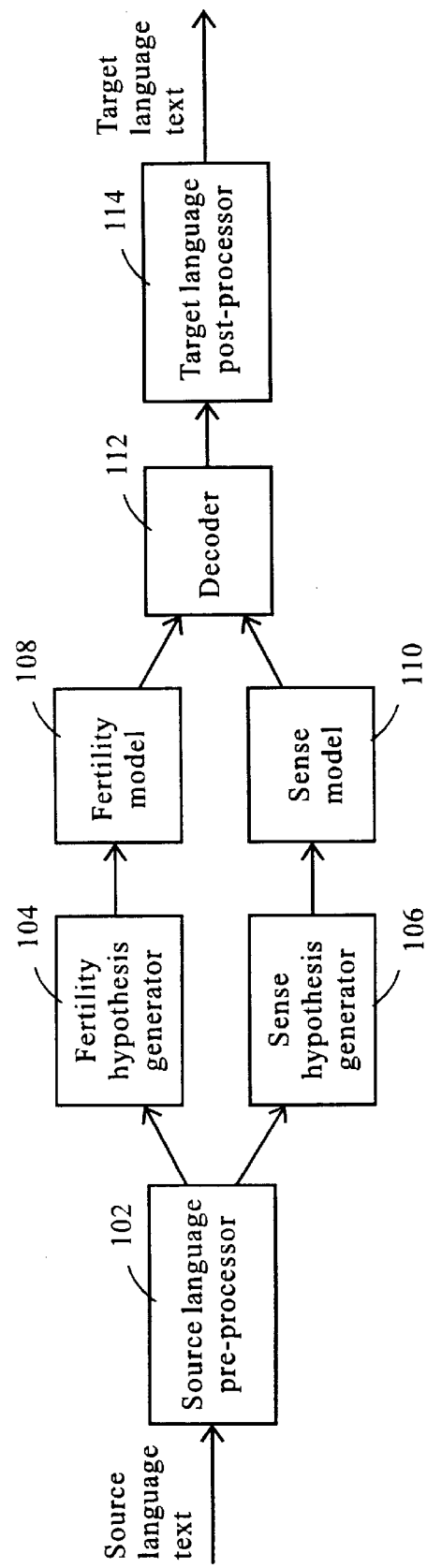
FIG. 1 is a block diagram of a translation system according to one embodiment of the present invention.

The invention is directed to a system and a method for translating a text in a first language to a text in a second language which is different from the first language. It should be understood that a preferred embodiment of the present invention will be explained in terms of a cross-language information retrieval system (CLIR) such as a cross-language World Wide Web search engine. However, the invention is in no way limited to retrieval applications. Rather, the system and method described herein are broadly applicable to translation from any one language into any other language. For example, the invention may be applied in a document classification or archival system, or in the translation of natural language to an artificially constructed formal language, as is frequently useful in natural language understanding systems. Given the teachings of the invention provided herein, one of ordinary skill in the related art will be able to contemplate these and similar implementations of the elements of the invention.

It is to be appreciated that the teachings of the present invention disclosed herein may be implemented in hardware, software, or a combination thereof. Preferably, the translation system and method is implemented in software and run on one or more appropriately programmed general purpose computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, the system and methods described herein may be considered to include a suitable and preferred processor architecture for practicing the invention which may be achieved by programming the one or more general purpose processors. Of course, special purpose processors may be employed to implement the invention. Given the teachings of the invention provided herein, one of ordinary skill in the related art will be able to contemplate these and similar implementations of the elements of the invention.

The computer system which is used to implement the translation system and method of the invention preferably includes input means for permitting a system user to input a first language (source) sentence(s). This may include, but is not limited to: a speech recognition system for converting spoken words into computer recognizable text words; a keyboard for directly inputting text words or a digital tablet or scanner for converting handwritten text into computer recognizable text words. Once input to the translation system, the first language (source) sentence(s) is then translated into a second language (target) sentence(s), as will be described below.

The invention described in this specification include systems for performing machine translation, wherein such systems employ a number of different components. There are various embodiments of each component, and various embodiments of the systems in which the components are connected together in different ways. Alternatively, the components may be represented as steps corresponding to various methods for performing machine translation.

To introduce the invention, an illustrative embodiment of a translation system according to the invention will described first, followed by an explanation of the construction of the translation model of the invention. Then, a brief explanation of the statistical approach to machine translation will be provided, followed by a detailed description of the translation system and method according to the invention. Further, the results of an implementation of the invention in an information retrieval system will described after the detailed description of the translation system and method.

Referring initially to FIG. 1, a block diagram is shown of a translation system according to one embodiment of the present invention. The translation system 100 includes: a source language pre-processor 102; a fertility hypothesis generator 104 operatively coupled to source language pre-processor 102; a sense hypothesis generator 106 operatively coupled to source language pre-processor 102; a fertility model 108 operatively coupled to fertility hypothesis generator 104; a sense model 110 operatively coupled to sense hypothesis generator 106; a decoder 112 operatively coupled to fertility model 108 and sense model 110; and a target language post-processor 114 operatively coupled to decoder 112. In the illustrative embodiment of the invention, the source language is French and the target language is English.

A brief explanation of the functionality of the components of translation system 100 will now be given. Initially, it is to be appreciated that the functions associated with source language pre-processor 102 and target language post-processor 114 are not critical to the invention. In fact, source language pre-processor 102 and target language post-processor 114 are optional components of system 100 and, therefore, may be omitted if so desired.

The source language text to be translated is input to source-language pre-processor 102, which tokenizes the source language, applies part of speech tags, determines morphological root words ("morphs"), and corrects errors in diacritical marks. The inclusion of source language pre-processor 102 in system 100, coupled with the inclusion of a similar source language pre-processor 202 in the training phase of system 100 (described with respect to FIG. 2), results in a better translation of rare source language words. This is because evidence gathered from different conjugations/declensions of the same morphological root word ("morph") can be incorporated into the decision of how to translate the rare words.

The fertility hypothesis generator 104 generates a number of hypothesis for the fertility of each source language word, given the source word and the context of the source word. The hypotheses are integers, e.g., 0, 1, 2, 3, 4, and so on. The term fertility as used herein refers to the number of target language words generated by a particular source language word. For example, the French word "communiqé" is sometimes translated literally into English as "communiqé" (fertility 1) and sometimes as "press release" (fertility 2).

The sense hypothesis generator 106 generates zero or more hypotheses (i.e., a target language word) for each sense of each source language word, given the source word and the context of the source word. The term "sense" as used herein refers to the different "senses" or meanings of a source language word (i.e., the french word pomme may be rendered as apple or as potato depending upon whether or not it is followed by de terre). The hypotheses may be a preselected list of common translations of each source language word.

The fertility model 108 is a language model for describing the probability of a fertility of a source language word, given the source language word and the context of the source language word. That is, fertility model 108 calculates the probabilities of each of the hypotheses generated by fertility hypothesis generator 104. The construction of language models is well known. In the illustrative embodiment, a deleted interpolation 4-gram model that has been symmetrized with respect to the left and right contexts is utilized. Such a language model is described in the following article: Bahl et al., "A Maximum Likelihood Approach to Continuous Speech Recognition", IEEE Transactions on Pattern Analysis and Machine Intelligence 5 (2), 1983. However, it is to be appreciated that the present invention, particularly the fertility model, is not limited to the above-described type of language model, and other types of language models may be utilized in accordance with the present invention.

Additionally, it is to be understood that the definition of context utilized with respect to fertility hypothesis generator 104 and fertility model 108 does not have to be identical to the definition of context used in the training phase of the translation system with respect to the fertility-context event accumulator 208 described with reference to FIG. 2 below. However, any differences between the two definitions are likely to compromise translation accuracy.

The sense model 110 is a language model for describing the probability of a target language word being the correct translation of a source language word, given the source language word and the context of the source language word. That is, sense model 110 calculates the probabilities of each of the hypothesis generated by sense hypothesis generator 106. In the illustrative embodiment of the invention, sense model 106 describes the above probabilities based on the average of a maximum-entropy trigram model for the left context and another maximum-entropy trigram model for the right context. Maximum-entropy trigram language models are described in the following articles: Berger et al., "A Maximum Entropy Approach to Natural Language Processing", Computational Linguistics, Vol. 22, p. 39, 1996; and Lafferty et al., "Inducing Features of Random Fields", IEEE Transactions on Pattern Analysis and Machine Translation, vol. 19, no. 4, pp. 380–93, April 1997. However, it is to be appreciated that the present invention, particularly the sense model, is not limited to the above-described type of language model, and other types of language models may be utilized in accordance with the present invention.

Additionally, it is to be understood that the definition of context utilized with respect to sense hypothesis generator 106 and sense model 110 does not have to be identical to the definition of context used in the training phase of the translation system with respect to the sense context event accumulator 210 described with reference to FIG. 2 below. However, any differences between the two definitions are likely to compromise translation accuracy.

The decoder 112 combines the probabilities calculated by fertility model 108 with the probabilities calculated by sense model 110 in order to produce a list of zero or more target language words that are output from system 100. If the fertility model 108 and/or the sense model 110 fail to provide enough information for decoding, the original source language word is outputted from system 100 unaltered. The original source word is outputted when there is no translation that we are confident of as being a correct translation. For example, if the training phase has never seen a particular word, there is a good chance that the particular word is a name. In the case when the probability of the fertility of the source word being equal to zero is greater than the probability of the fertility of the source word being equal to a value other than zero, the list of target words will contain a null word.

The target language post-processor 114 may conjugate verbs, decline nouns, and/or otherwise perform operations inverse to those performed by target language pre-processor 204 described with respect to FIG. 2 below. The target language post-processor 114 may also transform the text in ways to make it more readable or appear more natural, for example, by adjusting date/time formats. Since the functions performed by post-processor 114 are not critical for the purpose of information retrieval, as stated above, post-processor 114 may be omitted.

Figure 2:
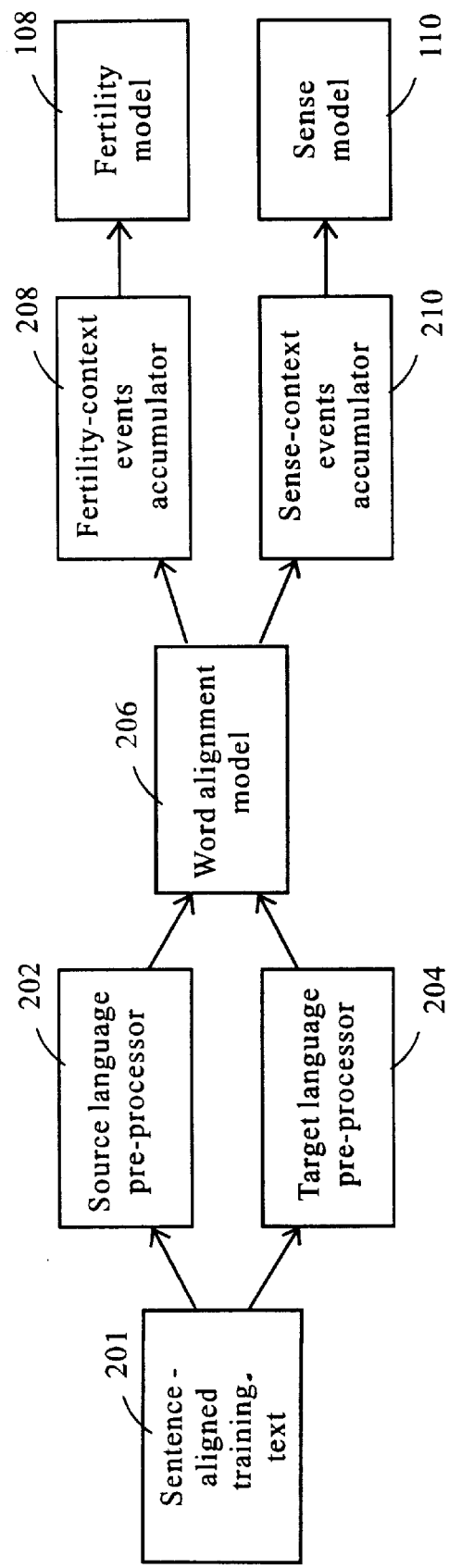
FIG. 2 is a block diagram illustrating the training phase of the translation system of FIG. 1 according to an embodiment of the present invention.

Referring to FIG. 2, a block diagram is shown illustrating the training phase of the translation system of FIG. 1 according to an embodiment of the present invention. The training phase includes: a source language pre-processor 202; a target language pre-processor 204; a word alignment model 206 operatively coupled to source and target language pre-processors 202 and 204; a fertility-context event accumulator 208 operatively coupled to word alignment model 206; a sense-context event accumulator 210 operatively coupled to word alignment model 206; a fertility model 208 operatively coupled to fertility-context event accumulator 208; and a sense model 110 operatively coupled to sense-context event accumulator 210. As stated above, in the illustrative embodiment of the invention, the source language is French and the target language is English.

A brief explanation of the functionality of the components utilized in the training phase of translation system 100 will now be given. Initially, it is to be appreciated that the functions associated with source language pre-processor 202 and target language pre-processor 204 are not critical to the invention. In fact, source language pre-processor 202 and target language pre-processor 204 are optional components and, therefore, may be omitted if so desired.

The training phase of translation system 100 starts with a sentence-aligned training text 201 comprised of a collection of N sentences in the source language and a collection of N sentences in the target language, with the property that each sentence of one collection is a translation of the corresponding sentence in the other. Canadian parliamentary proceeding ("Hansards") are an example of a sentence aligned training text. The steps that should be taken to ensure the sentence alignment property are discussed with respect to an algorithm in the following article: Brown et al., "Aligning Sentences in Parallel Corpora", Proceedings, 29$^{th}$ Annual Meeting of the Association for Computational Linguistics, Berkeley, Calif., pp. 169–176, June 1991. The algorithm uses the observation that the length in words of translation pairs of sentences are approximately proportional, and constructs a simple statistical model to allow for insertions and deletions of sentences. The algorithm may be combined with the use of "anchor points", which represent the locations of a few sentences that are known to be aligned.

The source language of the sentence-aligned training text is input to the source-language pre-processor 202. The source-language preprocessor tokenizes the source language training text, applies part of speech tags, and determines morphological root words ("morphs"). The inclusion of source language pre-processor 202 results in a better translation of rare words in the source language because evidence gathered from different conjugations/declensions of the same morphological root word ("morph") can be incorporated into the decision of how to translate the rare words.

The target language of the sentence-aligned training text is input to the target-language pre-processor. The target-language preprocessor tokenizes the target language training text, applies part of speech tags, and determines morphological root words ("morphs"). The inclusion of target language pre-processor 204 results in a better translation of words that translate into rare words in the target language because evidence gathered from different conjugations/declensions of the same morphological root word ("morph") can be incorporated into the decision of how to translate the rare words.

The word alignment model 206 determines an approximate alignment between the individual words of each sentence, given a pair of sentences T and S. The notations T and S are used to refer to a target-language sentence and a source language sentence, respectively. The construction of the alignment model is discussed extensively in the following article: P. F. Brown et al., "The Mathematics of Statistical Machine Translation: Parameter Estimation", Computational Linguistics, 19 (2), pp. 263–311, June 1993. As described in the preceding article, the typical procedure for constructing an alignment model consists of using an estimate of word translation probabilities to estimate the probabilities of various word alignments. The probabilities of the various word alignments are then used to re-estimate the word translation probabilities, and the procedure is repeated until the word translation probabilities and the probabilities of various word alignments have adequately converged.

The alignment model employed herein is identical to that referred to as Model 1 in the immediately preceding referenced article. Similar alignment models are described in the following machine translation patents assigned to the assignee herein and incorporated by reference herein: U.S. Pat. No. 5,510,981 to Berger et al., entitled "Language Translation Apparatus and Method Using Context-Based Translation Models", issued on Apr. 23, 1996; and U.S. Pat. No. 5,477,451 to Brown et al., entitled "Method and System for Natural Language Translation", issued on Dec. 19, 1995.

The fertility-context event accumulator 208 accumulates fertility-context events from the alignments determined by the word-alignment model 206 for some or all occurrences of the source word in a source language sentence. A confidence measure may be implemented in order to exclude unreliable events from being accumulated. Each fertility-context event includes a number of target language words that the source language word is aligned to, the source language word, and the context of the source-language word. In our implementation, the context consists of the preceding and following words (skipping over so-called stop words, which are short, frequently occurring words of no value in information retrieval). However, it is to be understood that the invention is not so limited and, rather, other definitions of context may also be used.

The sense-context event accumulator 210 accumulates sense-context events from the alignments determined by the word-alignment model for some or all occurrences of the source word in a source language sentence. A confidence measure may be implemented in order to exclude unreliable events from being accumulated. Each sense-context event includes the target word, the source-language word to which the target language word is aligned, and the context of the source-language word. In the illustrative embodiment, the same definition of context is used for fertility-context event accumulator 208 and sense-context event accumulator 210. However, it is to be understood that the invention is not so limited and, rather, different definitions of context may also be used.

The fertility model 108 and sense model 110 are constructed using the fertility-context events and sense-context events accumulated by the fertility-context event accumulator 208 and the sense-context event accumulator 210, respectively. The fertility and sense models are described more fully hereinbelow.

A brief explanation of the statistical approach to machine translation will now be given, followed by a detailed description of the translation system and method according to the present invention.

In general, statistical translation systems are trained on a parallel corpus of sentences which are known to be translations of each other, and which are aligned on a sentence-by-sentence basis. As stated above, Canadian parliamentary proceedings recorded in French and English ("Hansards") are one example of such a corpus. The underlying alignment of the words in the source and target languages are an important assumption in machine translation. This alignment is regarded as a hidden variable and, thus, is not known a priori. The fact that some of the sentences in the training corpus are translated "loosely" is not a serious concern with respect to the invention. This is because the system according to the invention, as described below, is sufficiently robust in the case of a considerable amount of noise.

As stated above, the notations T and S are used to refer to a target-language sentence and a source language sentence, respectively. In further describing such notations, target-language sentence T consists of the words $t_1, \ldots, t_{/T/}=t_1^{/T/}$, and source language sentence S consists of the words $s_1, \ldots, s_{/S/}=s_1^{/S/}$. Further, the notation A is used to generically refer to the alignment of a sentence pair. A typical (though incomplete) representation of the alignment is to assign to each word $t_i$ in T an integer $a_i \in \{1 \ldots |S|\}$ indicating which word in the source sentence the word in T is associated with. The number of values for i for which $a_i=j$ is referred to as the fertility $n_j$ of the j'th word in S. The source language sentence is typically augmented with a null word that is aligned to target language words that are not aligned with any other words.

Generally, in statistical models of machine translation, the goal is to model the conditional probability $$p(T \mid S) = \sum_A p(T, A/S) \quad (1)$$

that a human translator would have produced a target sentence T as the translation of a source sentence S. There are many ways to decompose P(T,A|S) into probabilities that are functions of individual words. One such decomposition is $$p(T, A \mid S) = \left[\prod_{i=1}^{|S|} p_f(n_i \mid n_0^{i-1} S)\right] p(A \mid N, S) \left[\prod_{j=1}^{|T|} p_s(t_j \mid t_0^{j-1}, A, S)\right] \quad (2)$$

This model's prescription for translating a sentence is that first, one picks the fertilities for the source language words, then one picks a set of alignments compatible with the fertilities, and lastly one picks the corresponding target language words with knowledge of what source language words the target language words are aligned to. Different choices for the target language words reflect different "senses" or meanings of the source language word. The notation $p_f$ is used to refer to the fertility model and the notation $p_s$ is used to refer to the sense model. This translation model is similar to, but trained and decoded in a different manner from, Model 3 described in the above referenced article: P. F. Brown et al., "The Mathematics of Statistical Machine Translation: Parameter Estimation", Computational Linguistics, 19 (2), pp. 263–311, June 1993. The assumption is made that an approximate alignment can be easily computed from some other model. An example of such a model, for which the Viterbi alignment of a pair of sentences can be precisely computed in a time period proportional to the product of the lengths of the sentences, is Model 1 of the preceding article.

The conditional probabilities in decomposition equation 2 depend upon too many parameters to be modeled. In order to make the computation feasible, the following simplification is made: since word order plays only a minor role in information retrieval, it will not be modeled. Instead, p(A/N,S) will simply be taken to be an unspecified constant (normalization is never needed). It is expected that both the fertility associated with a given source word, and also the target word that the source word translates into, will be primarily dependent on the source word itself, with some variance due to local context. Here, the local context of a word $s_i$ is represented by the preceding and the following non-stop words, denoted $s_{i-}$ and $s_{i+}$, respectively. In information retrieval, a stop word is a frequently occurring word such as "a", "and", or "some" that has little or no value in determining the relevance of a document to a query. Standard lists of stop words are widely available. Returning to the description of the source text, sentence boundaries are marked by an artificial "BOUNDARY_WORD" (which is not a stop word) so that the local context is well-defined at the start and the end of the sentence. The fertility and sense models according to the invention can now be summarized in a form suitable for modeling:

$$p_f(n_0^{i-1} S) \approx p_f(n_i \mid s_i, s_{i-}, s_{i+}) \quad (3)$$

$$p_s(t_j \mid t_0^{j-1}, A, S) \approx p_s(t_j \mid s_{aj}, s_{aj-}, s_{aj+}) \quad (4)$$

The translation model is completely specified by these functions. Note that the two functions that must be modeled are simply conditional probabilities of the occurrence of a word in one language (target language) given an ordered triplet of words in another language (source language). The "language" of fertility here is simply a set of small non-negative integers. This form is practically identical to that of language models, which have extensive use in speech recognition. For an article generally describing language models, see Bahl et al., "A Maximum Likelihood Approach to Continuous Speech Recognition", IEEE Transactions on Pattern Analysis and Machine Intelligence 5 (2), 1983. However, there are some minor differences between the form of the language model employed according to the invention and conventional language models. One such difference is that, in the language model employed according to the invention the history and future words are in different languages, whereas the history and future words in conventional language models are in the same language. However, this difference is of no significance, as the history and future words are typically indexed by integers in any event. Another difference is in the order of the words in the history for purposes of smoothing the distribution, which is overcome by symmetrizing the distributions with respect to interchange of $s_{i-}$ and $s_{i+}$ by replacing the distribution with the arithmetic mean:

$$\frac{1}{2}[p_f(n_i \mid s_i, s_{i-}, s_{i+}) + p_f(n_i \mid s_i, s_{i+}, s_{i-})] \quad (5)$$

However, it is to be understood that the invention is not so limited and, rather, other methods of symmetrization may also be used.

The procedure for training the translation model follows. First, using an alignment such as, for example, the well-known Viterbi alignment, find a word-by-word alignment for the training data. For each word ti in each target language sentence, accumulate the following language model events $(n_i, s_{ai}, s_{ai-}, s_{ai+})$ and $(t_i, s_{ai}, s_{ai-}, s_{ai+})$, with $n_i$ being the fertility of the i'th word in the source sentence, $s_{ai}$ being the word in the source sentence that is aligned with the i'th word in the target sentence, $s_{ai-}$ being the non-stop word preceding $s_{ai}$ in the source sentence, and $s_{ai+}$ being the non-stop word following $s_{ai}$ in the source sentence.

Using the events that have been accumulated, build the language models (i.e., the fertility and sense models)

$$p_f(n_i \mid s_i, s_{i-}, s_{i+}) \quad (6)$$

$$p_s(t_j \mid s_{aj}, s_{aj-}, s_{aj+}) \quad (7)$$

Decoding with this translation model proceeds as follows: for each source language word $s_i$, use the fertility model ($p_f$, Eq. 6) to predict the probabilities of the fertilities $n_i$ from $s_i$ and the local context of $s_i$. Using the same history and the sense model ($p_s$, Eq, 7), predict the probabilities for a small number (typically 5) of possible target words. It is not necessary to calculate the probability for all words in the target language. A short list of likely choices is easily obtained by thresholding the alignment model.

EXPERIMENTAL RESULTS

In order to test the quality of translation, we have incorporated the translation model described above into an information retrieval system, using a set of French documents (3 years of French-language newswire from the Swiss news agency SDA) and 25 queries for which relevance judgements have been supplied by NIST. These documents, queries, and judgments were used in an evaluation of cross-language information retrieval systems at the 6th Text REtrieval Conference (TREC-6) held in Gaithersburg, Md., Nov. 19–21, 1997.

The channel model (i.e., word alignment model 206) for predicting the word-by-word alignments was trained on sentenced pairs in which the lengths of both sentences (source and target) were less than 30 morphs in the Hansards corpus. The corpus had been morphologically analyzed, so that the "words" for the translation model were actually root words ("morphs"). Although the morphological analysis procedure is invertible, the inverse operation was not used because the information retrieval system also used morphologically analyzed text. The sense and fertility models were trained on sentence pairs with lengths of less than 60 "words" (morphs) using the channel model above as an alignment mode. The fertility model was a deleted interpolation 4-gram model, and the sense model was constructed from two maximum-entropy trigram models, one for the left context and one for the right context. The incorporation of the document translation system described above into our information retrieval system is trivial. We simply translated the three years of SDA newswire and used our information retrieval system on the resulting English text.

For comparison purposes, we also consider a simplification of the above (sense) model, such simplified model obtained by forcing n=1 for all source language words and removing the contextual dependence of the translated word:

$$p(t_j \mid t_0^{j-1}, A, S) = p(t_j \mid s_{aj}) \quad (8)$$

Since there is no contextual dependence, the most likely translation of each word in the source language vocabulary may be tabulated in advance. In fact, this simplification is just a statistically constructed dictionary.

Our performance on the test set was very good—in fact better than any of the participants in the evaluation. We see an 18% to 19% improvement in using our model as compared to using the statistically constructed dictionary. This demonstrates that the translation is of good quality for information retrieval purposes. Also, our translation was performed at least twenty times faster than a baseline translation by a state-of-the-art translation system on a comparable large task. Such comparison is based on the translation system described in the following article: Hackett et al., "Document Translation for Cross-Language Text REtrieval at the University of Maryland", The 6th Text REtrieval Conference (TREC-6), ed. by E. M. Voorhees and D. K. Harman, 1997.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for translating a series of source words in a first language to a series of target words in a second language, comprising:
   input means for inputting the series of source words;
   a fertility hypothesis generator operatively coupled to said input means for generating at least one fertility hypotheses for a fertility of a source word, based on the source word and a context of the source word;
   a sense hypothesis generator operatively coupled to said input means for generating sense hypotheses for a translation of the source word, based on the source word and the context of the source word;
   a fertility model operatively coupled to said fertility hypothesis generator for determining a probability of the fertility of the source word, based on the source word and the context of the source word;
   a sense model operatively coupled to said sense hypothesis generator for determining a probability of a target word being a correct translation of the source word, based on the source word and the context of the source word; and a decoder operatively coupled to said fertility and sense models for generating a list of target words for the translation of the source word, based on the probability calculated by said fertility model and the probability calculated by said sense model.

2. The system of claim 1, wherein the list of target words contains a null word, when the probability of the fertility of the source word being equal to zero is greater than the probability of the fertility of the source word being equal to a value other than zero.

3. The system of claim 1, wherein the context of the source word associated with said fertility model and said sense model includes at least one other word in the first language.

4. The system of claim 1, wherein the context of the source word associated with said fertility model and said sense model is a preceding and a following word of the source word.

5. The system of claim 1, wherein said fertility model is a deleted interpolation 4-gram model.

6. The system of claim 5, wherein the deleted interpolation 4-gram model has been symmetrized with respect to left and right contexts.

7. The system of claim 1, wherein said sense model utilizes an average from a maximum-entropy trigram model for a left context and another maximum-entropy trigram model for a right context.

8. The system of claim 1, further comprising a source language pre-processor operatively coupled between said input means and said fertility and sense hypothesis generators, for pre-processing the series of source words.

9. The system of claim 8, wherein the pre-processing of the series of source words comprises at least one of tokenizing, applying part of speech tags, determining morphological root words, and correcting errors in diacritical marks.

10. The system of claim 1, further comprising a target language post-processor operatively coupled to said decoder for at least one of conjugation of root words, declension of root words, and formatting of the target words output from the system.

11. The system of claim 1, wherein the at least one fertility hypotheses generated by said fertility hypothesis generator is an integer.

12. The system of claim 1, wherein the sense hypotheses generated by said sense hypothesis generator correspond to a pre-selected list of common translations of each source language word.

13. The system of claim 1, wherein the system is trained on a sentence-aligned training text including a plurality of sentences in the source language and a plurality of sentences in the target language, wherein each sentence in the plurality of source language sentences is a translation of a corresponding sentence in the plurality of target language sentences, and a training portion of the system comprises:

a word-alignment model for determining an alignment between the words of each of the plurality of source language sentences and the corresponding target language sentence;

a fertility-context event accumulator for accumulating fertility-context events from the alignments determined by said word-alignment model for at least some occurrences of the source word in a source language sentence, each fertility-context event including a number of target language words that the source language word is aligned to, the source language word, and the context of the source-language word;

a sense-context event accumulator for accumulating sense-context events from the alignments determined by said word-alignment model for at least some occurrences of the source word in a source language sentence, each sense-context event including the target word, the source-language word to which the target language word is aligned, and the context of the source-language word; and wherein said fertility model and said sense model are constructed using the fertility-context events and sense-context events accumulated by said fertility-context event accumulator and said sense-context event accumulator, respectively.

14. The system of claim 13, wherein a confidence measure is used to exclude unreliable fertility-context and sense-context events from being accumulated by said fertility-context and sense-context event accumulators, respectively.

15. The system of claim 13, wherein the training portion of the system further comprises:

a source language pre-processor operatively coupled to said word-alignment model for pre-processing the plurality of sentences in the source language.

16. The system of claim 15, wherein the pre-processing of the plurality of sentences in the source language comprises at least one of tokenizing, applying part of speech tags, determining morphological root words, and correcting errors in diacritical marks.

17. The system of claim 13, wherein the training portion of the system further comprises:

a target language pre-processor operatively coupled to said word-alignment model for pre-processing the plurality of sentences in the target language.

18. The system of claim 17, wherein the pre-processing of the plurality of sentences in the target language comprises at least one of tokenizing, applying part of speech tags, determining morphological root words, and correcting errors in diacritical marks.

19. A method for translating a series of source words in a first language to a series of target words in a second language, comprising the steps of:

inputting the series of source words;

generating at least one fertility hypotheses for a fertility of a source word, based on a source word and a context of the source word;

generating sense hypotheses for a translation of the source word, based on the source word and the context of the source word;

determining a probability of a fertility of a source word, based on the source word and the context of the source word;

determining a probability of a target word being a correct translation of the source word, based on the source word and the context of the source word; and generating a list of target words for the translation of the source word, based on the probability of the fertility and the probability of the target word.

20. The method of claim 19, wherein the list of target words contains a null word, when the probability of the fertility of the source word being equal to zero is greater than the probability of the fertility of the source word being equal to a value other than zero.

21. The method of claim 19, wherein the context of the source word in said determining steps includes at least one other word in the first language.

22. The method of claim 19, wherein the context of the source word in said determining steps is a preceding and a following word of the source word.

23. The method of claim 19, wherein the probability of the fertility of the source word is determined using a deleted interpolation 4-gram model.

24. The method of claim 23, wherein the deleted interpolation 4-gram model has been symmetrized with respect to left and right contexts.

25. The method of claim 19, wherein the probability of the target word is determined using an average from a maximum-entropy trigram model for a left context and another maximum-entropy trigram model for a right context.

26. The method of claim 19, further comprising the step of pre-processing the series of source words before generating the at least one fertility hypotheses and the sense hypothesis.

27. The method of claim 26, wherein said pre-processing step further comprises at least one of tokenizing, applying part of speech tags, determining morphological root words, and correcting errors in diacritical marks.

28. The method of claim 19, further comprising the step of post-processing the list of target words.

29. The method of claim 28, wherein said post-processing step comprises one of conjugation of root words, declension of root words, and formatting the target words.

30. The method of claim 19, wherein the at least one generated fertility hypotheses is an integer.

31. The method of claim 19, wherein the generated sense hypotheses correspond to a pre-selected list of common translations of each source language word.

32. The method of claim 19, wherein the method is trained on a sentence-aligned training text including a plurality of sentences in the source language and a plurality of sentences in the target language, wherein each sentence in the plurality of source language sentences is a translation of a corresponding sentence in the plurality of target language sentences, and a training portion of the method comprises:

determining an alignment between the words of each of the plurality of source language sentences and the corresponding target language sentence;

accumulating fertility-context events from the alignments for at least some occurrence of the source word in a source language sentence, each fertility-context event including a number of target language words that the source language word is aligned to, the source language word, and the context of the source-language word;

accumulating sense-context events from the alignments for at least some occurrence of the source word in a source language sentence, each sense-context event including the target word, the source-language word to which the target language word is aligned, and the context of the source-language word; and wherein the probability of the fertility of the source word and the probability of the target are determined using the accumulated fertility-context and sense-context events, respectively.

33. The method of claim 32, further comprising the step of implementing a confidence measure to exclude unreliable fertility-context and sense-context events from being accumulated.

34. The method of claim 32, wherein the training portion further comprises the step of:

pre-processing the plurality of sentences in the source language.

35. The method of claim 34, wherein the pre-processing of the plurality of sentences in the source language comprises at least one of tokenizing, applying part of speech tags, determining morphological root words, and correcting errors in diacritical marks.

36. The method of claim 32, wherein the training portion further comprises the step of:

pre-processing the plurality of sentences in the target language.

37. The method of claim 36, wherein the pre-processing of the plurality of sentences in the target language comprises at least one of tokenizing, applying part of speech tags, determining morphological root words, and correcting errors in diacritical marks.

* * * * *